Dec. 14, 1937.  C. GIBSON  2,102,458
AMUSEMENT DEVICE
Filed April 13, 1936
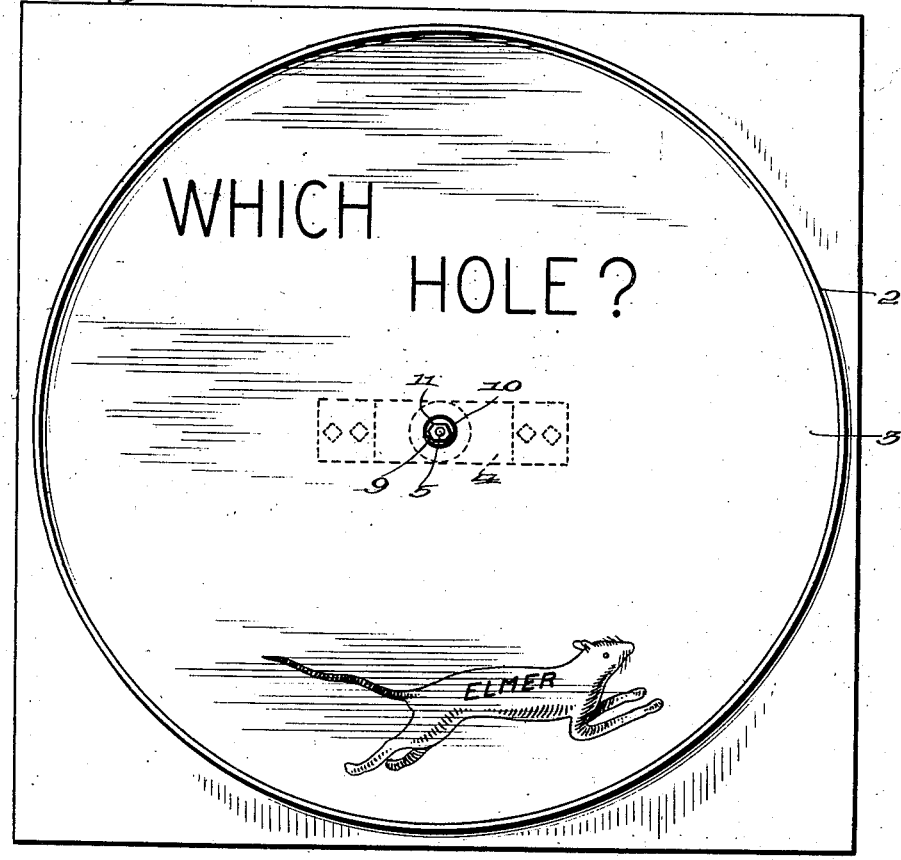
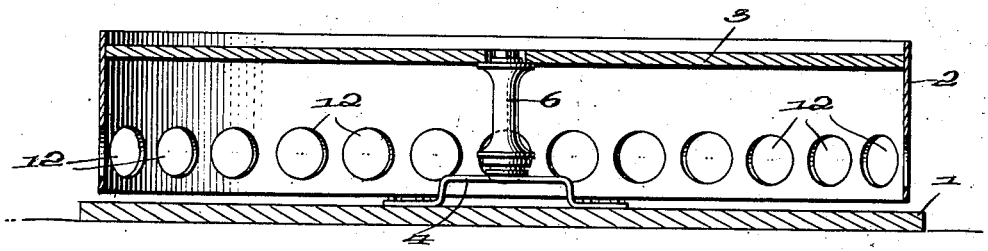
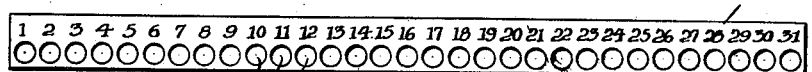
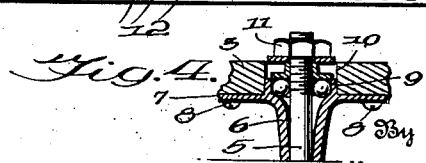

Patented Dec. 14, 1937

2,102,458

UNITED STATES PATENT OFFICE 2,102,458

AMUSEMENT DEVICE

Carter Gibson, San Angelo, Tex.

Application April 13, 1936, Serial No. 74,197

3 Claims. (Cl. 273—143)

This invention relates to an improvement in amusement devices.

The object of the invention is to provide a novel and unusual amusement device, which may be used to create interest in the business of a retail store, for instance, as an advertising idea.

In carrying out the object of this invention, a drum is rotatably mounted on a base, so that it is capable of being spun by hand and allowed to come to rest after being thus spun. The drum forms an enclosure for an animal, such as a rat or mouse, and is provided with holes in its peripheral surface which may be appropriately numbered or designated, the object being to guess or determine the hole through which the rat or mouse will emerge, after the drum stops rotating. This forms an interesting and unusual game which may be used, for instance, as an advertising medium, particularly when the peripheral holes are designated with the days of the month or in some other way to connect it with an appropriate business. A preferred embodiment of the invention is shown in the accompanying drawing, in which:

Fig. 1 is a top plan view of the amusement device;

Fig. 2 is a vertical sectional view therethrough, partly in elevation;

Fig. 3 is a view of the peripheral portion of the drum spread out; and

Fig. 4 is a detail sectional view.

The invention is shown as comprising a base 1, upon which a drum 2 is adapted to be rotatably mounted. The drum is of cylindrical shape and is adapted to be rotatably mounted upon the base 1 for turning movement relative thereto, for which purpose the drum 2 has a top 3, carrying the drum 2 at its periphery.

For rotatably supporting the drum upon the base 1, a bracket 4 is fixed on the base and carries a spindle 5, on which a sleeve 6 is rotatably mounted, as on ball bearings. The upper end of the sleeve 6 has an outturned flange 7, supporting the top 3 of the drum and secured thereto as by screws 8. The upper end of the sleeve 6 is provided with an upstanding flange 9, extending into a central opening 10 in the top 3 to locate said top and the drum carried thereby with respect to the sleeve 6. The parts are held in place by a nut 11, threaded onto the upper end of the spindle 5. This forms a rotatable support for the top 3 of the drum 2 on the base 1, and permits free and easy turning of the drum relative to the base, so that it may be spun manually and then allowed to come to rest gradually.

The drum 2 is securely mounted on the periphery of the top 3 and extends therearound and down to a point in relatively close proximity to the base 1, so as to form an enclosure over the base, sufficient to trap a small animal, such as a rat or mouse, the spacing of the lower edge of the drum 2 from the base 1 being only sufficient to permit free rotation of said drum.

In order to permit the escape of the trapped animal from within the drum 2, after the latter has been spun and come to a rest, the drum 2 is provided with a plurality of holes therethrough, designated 12, the numbering and spacing of which holes may be varied as desired, but as shown in Fig. 3, the drum 2 is provided with thirty-one holes, corresponding with the days of the month, where the amusement device is used in an advertising campaign which is related to the days of the month.

It will be obvious that a rat or mouse may be placed in the drum 2, through one of the holes 12, and then the drum may be spun by turning it manually, which will confine the animal in the drum until the latter has approximately ceased its rotation and has substantially come to a rest, upon which the trapped animal is permitted to escape through one of the holes 12, the object being to guess or determine through which of the holes the animal will emerge or escape. The designation of the holes with numerals or in some other way permits the utilization of the amusement device for advertising purposes.

This invention is very simple and unusual and has attracted a great deal of attention in the use already made of it for advertising purposes. Its simplicity enables it to be constructed at very small cost, and yet it forms a very attractive amusement device.

I claim:

1. An amusement device comprising a base having a surface to receive an animal thereon, a bracket attached thereto, a spindle fixed to the bracket and extending upwardly therefrom, a sleeve journaled on the spindle, a drum having a top fixed to the upper end of the sleeve, said drum being adapted to confine the animal between the top and base, means connected with the spindle for detachably holding the sleeve in place on the spindle, said drum having a plurality of peripheral openings therethrough for the escape of the confined animal within the drum following rotation thereof.

2. An amusement device comprising a base having a surface to receive an animal thereon, a top having a peripheral drum carried thereby and depending from the outer edge thereof toward the base in relatively close relation thereto for confining the animal between the top and base, said drum having peripheral escape openings therein for the confined animal, and means centrally mounting the top rotatably in superimposed, spaced relation on the base.

3. An amusement device comprising a base having a surface to receive an animal thereon, a top spaced above the base and having a peripheral drum carried thereby and depending from the outer edge of the top toward the base in relatively close relation thereto for confining the animal between the top and base, said drum having peripheral escape openings therein for the confined animal, and a central standard carried by the base and extending upwardly therefrom and journaling the top in superimposed relation above the base for rotation of the drum relative thereto.

CARTER GIBSON.